United States Patent [19]

Ingram et al.

[11] 4,029,869

[45] June 14, 1977

[54] METHOD OF MAKING BROADER MOLECULAR WEIGHT DISTRIBUTION POLYSTYRENE

[75] Inventors: Alvin R. Ingram; Harold A. Wright, both of Murrysville, Pa.

[73] Assignee: ARCO Polymers, Inc., Philadelphia, Pa.

[22] Filed: Dec. 30, 1975

[21] Appl. No.: 645,160

[52] U.S. Cl. .............................. 526/233; 526/327; 526/347
[51] Int. Cl.² ....................................... C08F 212/08
[58] Field of Search ............... 260/88.2 C, 86.7; 526/233, 327, 347

[56] References Cited

UNITED STATES PATENTS 2,341,175  2/1944  Britton et al. .................... 260/86.7
2,912,418  11/1959  Johnson et al. .................. 260/86.7

OTHER PUBLICATIONS

Chem. Abs. 54 (1960) p. 14158(b).

*Primary Examiner*—Harry Wong, Jr.
*Attorney, Agent, or Firm*—Lewis J. Young

[57] ABSTRACT

Attempts to prepare polystyrene by peroxide-initiated suspension polymerization at 125° C resulted in polymer having narrower molecular weight distribution than desired. The problem has been solved by copolymerizing the styrene with from 0.05 to 0.35 weight per cent, based on styrene, of a modifying comonomer consisting of a non-conjugated diolefinic compound having one very reactive olefinic group and one less reactive olefinic group such as, for example, allyl methacrylate.

1 Claim, No Drawings

METHOD OF MAKING BROADER MOLECULAR WEIGHT DISTRIBUTION POLYSTYRENE

BACKGROUND OF THE INVENTION

Polystyrene beads are produced by heating an agitated suspension of styrene, having a free-radical-generating initiator dissolved therein, in an aqueous medium with the aid of a suspending agent. The suspending agent may be a finely-divided solid (e.g. tricalcium phosphate or zinc oxide) or a film-forming, water-soluble polymer (e.g. hydroxyethyl cellulose or polyvinyl alcohol). The time-temperature cycle is determined by the rate at which free radicals are generated and consumed to form polymer. The free radicals are created by the influence of heat on the monomer and the initiator. The polymerization of styrene at 90° C with benzoyl peroxide as primary initiator proceeds at a rate of about 13–15% conversion per hour and yields polymer with a typically broad molecular weight distribution. The polymerization of styrene at 115°–130° C with t-butyl perbenzoate as primary initiator proceeds at a rate of about 25–35% per hour. However, the molecular weight distribution of the polystyrene made at the higher temperature is narrower although the solution viscosity may be identical with that made at the lower temperature.

SUMMARY OF THE INVENTION

It has now been found that the suspension polymerization of styrene can be carried out at faster rates at increased temperatures without narrowing its molecular weight distribution by introducing into the polymerization mixture from 0.05 to 0.35 per cent by weight, based on styrene, of a comonomer consisting of a non-conjugated diolefinic compound having one very reactive olefinic group and one less reactive olefinic group. Suitable comonomers are, for example, allyl methacrylate, allyl acrylate, and allylstyrene. Divinyl comonomers cause excessive cross-linking at low concentrations, while diallyl comonomers cause reduced rate of polymerization and leave excessive residual monomer at charge levels high enough to gain the desired effect on molecular weight.

This invention is applicable to any free-radical polymerization if a broadening of molecular weight distribution is required.

DETAILED DESCRIPTION OF THE INVENTION

Hohenstein U.S. Pat. No. 2,652,392, describes the suspension polymerization of styrene, whereby the oil monomer is suspended as droplets in an agitated and heated aqueous medium and polymer beads or particles are produced with the aid of an oil-soluble polymerization catalyst, such as benzoyl peroxide. The suspending system is comprised of finely divided, difficultly water-soluble inorganic phosphates, and a water-soluble persulfate which serves as an extender. The finely divided, difficultly water-soluble phosphates contain for each phosphate group at least three equivalents of a metal, the carbonate of which is only slightly soluble in water, e.g., calcium phosphate or magnesium phosphate. Advantageously, the amount of phosphate to be employed in this invention ranges from about 0.10 to 5.0 per cent by weight based on styrene.

various other suspending agents and agitation systems to make polystyrene beads suitable for this invention were reviewed by A. R. Ingram and J. Fogel on page 536, Chapter 10 of the book, "Plastic Foams,". Part II edited by K. C. Frisch and J. H. Saunders and published in 1973 by Marcel Dekker, Inc.

The process of the invention may be used with styrene-to-water ratios which vary from about 0.3 to 1.5 parts by weight styrene per 1.0 part by weight water. The invention is especially valuable in that generally high monomer-to-water ratios are used, and a higher proportion of monomer in the suspension system is preferred from an economic standpoint.

The time and temperature cycles for the polymerization may be those conventionally employed, such as from 80° to 140° C for times of from 15 to 3 hours. A cycle for the preparation of molding grade polystyrene, employing benzoyl peroxide as primary initiator, has been, for example, 7 hours at 90° C plus 4 hours at 115° C to polymize the remaining 5% of monomer. The rate of polymerization may be increased by using higher temperatures. Thus, polystyrene of similar molecular weight can also be prepared in 4 hours at 125° C, usng t-butyl perbenzoate as initiator. However, the higher temperature, besides increasing the rate of polymerization, also results in a narrowing of the molecular weight distribution of the polymer product.

Molecular weight distribution, as used herein, is the ratio of weight-average molecular weight ($M_w$) to number-average molcular weight ($M_n$). This ratio is also known as the heterogeneity index. Normally, the weight-average molecular weight may be determined directly by light scattering measurement or indirectly by intrinsic viscosity measurements, and the number-average molecular weight may be determined by osmometry measurements. In this patent, both of the molecular weights were determined by calculation from gel permeation chromatograph measurements.

The narrowing of the molecular weight distribution is undesirable because it affects the extrusion and foaming properties of the polymer, causing a decrease in viscosity and melt extensibility at fabrication temperatures.

The addition of a mild cross-linking agent has been found to allow the use of higher polymerization temperatures without this undesirable side effect. The agents suitable for the present invention are those not-conjugated diolefinic compounds wherein one of said olefinic groups is very reactive in free-radical polymerization systems and the second olefinic group is less reactive. In this case, very reactive olefinic groups are, especially, the vinyl, acrylate and methacrylate groups which copolymerize readily with styrene. The less reactive olefinic groups may be, for example, the allyl group, and similar groups known to undergo rapid chain-transfer reaction with free radicals, but not to copolymerize readily with styrene. Typical of such diolefinic compounds are allyl acrylate, allyl methacrylate and allylstyrene(s). The allyl esters may be prepared by the reaction of allyl alcohol with the respective acid chlorides. The allylstyrenes may be prepared by the reaction of allyl magnesium chloride with the appropriate ring-halogenated styrene or by the reaction of vinyl magnesium bromide with the chloromethylstyrene desired. Either ortho-, meta-, or para-allylstyrene or their mixtures can be used for the present invention.

Not suitable as the diolefinic compound of this invention are those compounds wherein both olefinic groups have the same reactivity, such as for example, divinylbenzene, diallyl phthalate, and other divinyl or diallyl compounds. Divinyl compounds readily cross-link with styrene at very low concentrations to form insoluble, non-moldable polymers. Diallyl compounds, because of the chain transfer reaction, tend to retard the polymerization at the shorter times and leave excessive residual monomers in the product.

The free-radical initiating catalysts which are added to the suspension system are the conventional oil-soluble oxidation catalysts such as organic peroxides, e.g. benzoyl peroxide, tert-butyl perbenzoate, etc. Other free-radical generating initiators that may be used in the invention include the azo-type catalysts, e.g., azobisisobutyronitrile. Conveniently, conventional amounts of such catalysts are used in the invention.

The invention is further illustrated by, but is not intended to be limited by, the following examples wherein parts are parts by weight unless otherwise indicated.

EXAMPLE I

To a 12-ounce Crown cap bottle, were added 100 parts of water containing 2.0 parts of tricalcium phosphate dispersing agent, 0.004 part of potassium persulfate as extender for the dispersing agent, 0.25 part of benzoyl peroxide and 0.05 part of t-butyl perbenzoate as initiators, and 100 parts of styrene. The bottle was capped and placed in an oil bath, heated to 90° C over a period of about 1 hour, and maintained at 90° C for 7 hours plus 115° C for 4 hours with end-over-end agitation. At the end of the 90° C period, the conversion of monomer to polymer was approximately 95%. The bottle was then cooled to room temperature, opened, and the suspension acidified with hydrochloric acid to a pH of about 1.0. The polymer beads were separated from the aqueous phase and washed with water in a centrifuge. The beads were air-dried on trays. The product had an intrinsic viscosity of 0.88 in toluene at 30° C and a $M_w/M_n$ of 2.6 as determined by gel permeation chromatography in tetrahydrofuran. Residual monomer content was 0.07%.

EXAMPLE II

To each of a series of 12-ounce Crown cap bottles, were added 100 parts of water containing 2.0 parts of tricalcium phosphate dispersing agent, 0.004 part of potassium persulfate as extender for the dispersing agent, 100 parts of styrene, and the parts of allyl methacrylate and t-butyl perbenzoate initiator shown in Table I. The bottles were capped and placed in an oil bath, heated to 125° C over a period of 2 hours, and maintained at 125° C for 4 hours with end-over-end agitation. The bottles were then cooled to room temperature, opened, and the suspensions acidified with hydrochloric acid to a pH of about 1.0. The polymer beads were separated from the aqueous phase and washed with water in a centrifuge. The beads were air-dried on trays. The results are shown in the Table. Intrinsic viscosities were measured in toluene at 30° C. The molecular weight distributions were determined by gel permeation chromatography in tetrahydrofuran. Residual styrene monomer contents were 0.2% or less; residual allyl methacrylate, 0.05% or less.

Table I

| t-Butyl Perbenzoate % | Allyl Methacrylate % | Polymer Characterization | |
|---|---|---|---|
| | | Intrinsic Viscosity | Molecular Weight Distribution $M_w/M_n$ |
| 0.125 | 0.00 | 0.88 | 2.3 |
| 0.15 | 0.00 | 0.77 | 2.1 |
| 0.15 | 0.05 | 0.80 | 2.1 |
| 0.15 | 0.10 | 0.88 | 2.45 |
| 0.15 | 0.15 | 0.97 | 2.76 |
| 0.15 | 0.20 | 1.06 | — |
| 0.15 | 0.25 | 1.16 | 3.36 |
| 0.15 | 0.40 | gelled | gelled |
| 0.175 | 0.15 | 0.90 | 2.61 |
| 0.175 | 0.20 | 0.98 | — |
| 0.20 | 0.15 | 0.86 | 2.67 |
| 0.20 | 0.20 | 0.92 | 2.93 |
| 0.20 | 0.30 | 1.14 | — |
| 0.225 | 0.20 | 0.88 | 2.70 |
| 0.225 | 0.25 | 0.94 | — |
| 0.25 | 0.25 | 0.91 | — |
| 0.30 | 0.30 | 0.89 | — |

The data in Table I show that polystyrene of 0.88 intrinsic viscosity prepared at 125° C with 0.125% t-butyl perbenzoate as initiator has a significantly lower $M_w/M_n$ (i.e. 2.3) than that (2.6; see Example I) of similar intrinsic viscosity made at 90° C with 0.25% benzoyl peroxide as primary initiator. However, the $M_w/M_n$ ratio can be increased as desired by appropriate adjustment of the concentrations of t-butyl perbenzoate and allyl methacrylate. Thus, the styrene polymer made in 4 hours at 125° C in the presence of 0.175% t-butyl perbenzoate and 0.15% allyl methacrylate exhibited the same conversion, solution viscosity and molecular weight distribution as that made in 7 hours at 90° C and 4 hours at 115° C in the presence of 0.25% benzoyl peroxide and 0.05% of t-butyl perbenzoate.

EXAMPLE III

The procedure of Example II with 0.15% t-butyl perbenzoate was repeated, except the allyl methacrylate was replaced by 0.1 part by weight per 100 parts by weight of styrene of respectively, allyl acrylate, allylstyrene, divinylbenzene, and diallyl phthalate. On recovery of the polymers, the allyl acrylate and allylstyrene-containing runs were found to have viscosity and molecular weight distribution value within the expected range. Divinylbenzene was found to give highly cross-linked, insoluble polymers, while diallyl phthalate gave low viscosity polymer having volatile contents too high for molding grade polystyrenes.

We claim:
1. In a process for polymerizing styrene in aqueous suspension at temperatures of from 80° to 140° C. in the presence of an oil-soluble, free-radical generating initiator, where the suspension is stabilized by the presence of from 0.10 to 5.0 per cent by weight based on styrene of a finely divided, difficultly water-soluble phosphate and an extender for said phosphate, the improvement comprising adding to the polymerizing styrene 0.05 to 0.35 part per 100 parts of styrene of a modifying comonomer selected from the group consisting of allyl acrylate, allyl methacrylate, and allylstyrenes, whereby a broadening of the molecular weight distribution is obtained without forming a polymer insoluble in organic solvents for polystyrene.

* * * * *